United States Patent [19]
Nettman et al.

[11] 4,206,983
[45] Jun. 10, 1980

[54] CAMERA STABILIZING BODY MOUNT

[75] Inventors: Ernst F. Nettman; Ronald P. Dexter, both of Los Angeles, Calif.

[73] Assignee: Continental Camera Systems, Inc., Van Nuys, Calif.

[21] Appl. No.: 936,852

[22] Filed: Aug. 25, 1978

[51] Int. Cl.² ............................................ G03B 17/00
[52] U.S. Cl. ................................. 352/243; 248/292.1; 354/82; 354/293; 224/201
[58] Field of Search .................... 352/243; 354/81, 82, 354/293; 224/5 V, 201; 248/280, 281, 292, 123

[56] References Cited

U.S. PATENT DOCUMENTS

| | | | |
|---|---|---|---|
| 1,319,792 | 10/1919 | Phorson | 248/123 |
| 2,036,097 | 3/1936 | Pieper | 248/280 |
| 2,746,369 | 5/1956 | Beard | 352/243 |
| 2,945,428 | 7/1960 | Dearborn | 352/243 |
| 3,044,346 | 7/1962 | Fieux | 248/123 |
| 3,332,593 | 7/1967 | Fauser | 354/82 |
| 3,352,521 | 11/1967 | Tyler | 248/123 |
| 3,467,350 | 9/1969 | Tyler | 248/179 |
| 3,900,140 | 8/1975 | Kelso et al. | 224/5 V |
| 4,017,168 | 4/1977 | Brown | 354/82 |
| 4,037,763 | 7/1977 | Turchen | 352/243 |

FOREIGN PATENT DOCUMENTS

| | | | |
|---|---|---|---|
| 441148 | 2/1927 | Fed. Rep. of Germany | 354/293 |
| 1441076 | 4/1966 | France | 248/280.1 |
| 866524 | 4/1961 | United Kingdom . | |
| 1203250 | 8/1970 | United Kingdom | 354/293 |
| 1391362 | 4/1975 | United Kingdom . | |

*Primary Examiner*—Monroe H. Hayes
*Attorney, Agent, or Firm*—Poms, Smith, Lande & Rose

[57] ABSTRACT

An apparatus for stabilizing the position of a unitary camera means relative to the body of a cameraman including a camera carrying assembly providing for movement of the camera about panning, tilting, and roll axes, a fulcrum mounted support member for the camera carrying assembly adapted to position the carrying assembly in spaced relation to the body of a cameraman, a body mount for the support member for counterbalancing and transferring the weight of the camera carrying assembly to the body of the cameraman at the lower body or hip region of the cameraman, and a tensioned cable carried by the body mount and support member and connected to the camera carrying assembly for suspending the assembly and for providing relative vertical movement of the camera carrying assembly relative to the support member and cameraman. The camera carrying assembly comprises a horizontal support member having a bracket at one end for carrying a unitary camera means, television equipment and power packs supported from the opposite end of the horizontal support member, an adjustable television viewfinder means intermediate ends of the horizontal member, and clevis means intermediate ends of the horizontal member for connecting the horizontal member with the tension cable. The body mount provides a fulcrum or pivotal mounting for the support member intermediate ends of the support member, counterbalancing spring means for the camera carrying assembly suspended from the forward end of the support member, and adjustable connecting means for positioning the support arm on one or the other side of the head of a cameraman.

16 Claims, 20 Drawing Figures

CAMERA STABILIZING BODY MOUNT

BACKGROUND OF INVENTION

The present invention relates generally to photographic equipment and more particularly to a system for stabilizing a mobile camera relative to its main support means, in this example a cameraman's body. Hand held cameras are subject to undesirable motion from the body of a cameraman which results in unacceptable photographic prints. It is, therefore, desirable to stabilize the camera position, reduce to a minimum the transfer of body motion to the camera, and to permit the camera to be under stabilized control under both stationary and mobile conditions.

Prior proposed stabilizing devices for photographic camera equipment or other like devices have included various types of apparatus carried by the cameraman to facilitate stabilizing control of the camera. One prior art hand held camera stabilizer is shown in U.S. Pat. No. 2,945,428 in which an elongated rectangular frame was supported by shoulders of the cameraman, the camera being carried by the frame forwardly of the cameraman and the weight suitably counterbalanced at the other end of the frame. A somewhat similar parallel frame structure is shown in British Pat. No. 1,203,250 wherein the parallel support members are supported from the shoulders of a cameraman, the camera is mounted forwardly on a transverse member suspended from ends of the support members, and counterbalance springs support the opposite ends of the support members with a harness which encircles the waist of the cameraman. In one example, the camera is suspended from the ends of the support member.

In U.S. Pat. No. 4,017,168, a camera is carried by a gimbal on the upper end of a single handle, the gimbal being connected to a pair of interconnected spring loaded arms which are pivotally supported from a harness worn on the body of a cameraman. Camera components are expanded so the center of gravity and center of moment of inertia of the expanded components are centered at the gimbal to provide isolation of movement of the cameraman's body from the camera.

Other prior art relating to the support of cameras which are used under mobile conditions such as on a vehicle, boat, airplane or helicopter and which employ mechanical support means for the camera carrying equipment in place of the cameraman's body are shown in U.S. Pat. Nos. 3,352,521; 3,467,350; British Pat. No. 1,391,362 and 866,524.

The prior proposed apparatus for use with a cameraman's body presented various types of problems. In the apparatus shown in Pat. No. 2,945,428 and British Pat. No. 1,203,250, the parallel bars which straddled the head of the cameraman and which were supported on the shoulders of the cameraman tended to limit mobility of the cameraman, especially in passing through doorways in turning or panning since the entire body of the cameraman was required to be turned. In addition, movement about a tilt axis; that is, downwardly or upwardly, was quite limited.

In the apparatus as shown in U.S. Pat. No. 4,017,168, the cameraman had excellent mobility and the camera isolation would permit movement of the cameraman's body relative to the gimbal through almost 360°. However, in the apparatus of U.S. Pat. No. 4,017,168, inertial movement of the camera system was difficult to precisely control with one hand because of the tendency of the system to hunt or seek its final position because of the inertia forces acting at one point. Another disadvantage of this apparatus was that the support load was carried at the front of the body of the cameraman with the result that a strain was placed on the back of the cameraman, if he were to maintain an erect position. To compensate for such loading, the cameraman often was required to lean backwardly or to brace himself against the forward, virtually overhanging weight.

Thus, generally speaking, prior art hand controlled and stabilized camera mounting apparatus, while vastly improving stabilization of the camera and isolating the camera from unwanted motions of the cameraman's body, still included problems of precise control of the camera position relative to the cameraman's body without imposing undue stress or strain on the cameraman's body. In this respect, it will be understood that the weight of a camera unit, together with a film magazine, a camera motor, the weight of the structural apparatus and other accessories such as a television camera, a television viewfinder, television components may weigh between 20 and 40 pounds. To carry such a weight which is not properly supported on the cameraman's body will cause undue fatigue and strain or injury to the back of the cameraman.

SUMMARY OF INVENTION

The present invention contemplates a camera stabilizing body mount which avoids many of the disadvantages of prior proposed camera stabilizing means and which provides a body mount readily adapted to a cameraman's body for minimizing fatigue and which is adapted to provide stabilized movement of the camera in panning, tilting, and rolling motion and also limited vertical movement relative to the cameraman's body.

The primary object of the present invention is to provide a novel apparatus for stabilizing a camera position relative to a cameraman's body.

An object of the invention is to provide such an apparatus wherein the weight of the apparatus is transferred to the body of the cameraman in a most effective manner whereby mobility of the cameraman is virtually unaffected.

Another object of the invention is to provide such a novel apparatus in which the apparatus is carried by the cameraman's body in such a manner as to minimize fatigue and strain.

Another object of the invention is to provide a novel apparatus for stabilizing the position of a camera wherein the camera is adapted to be moved in pan, tilt and roll axes while being suspended from a support means in front of a cameraman.

Still another object of the present invention is to provide such a novel apparatus which utilizes a horizontal support member supported from a forward end of a support means by a clevis means.

Still another object of the invention is to provide a novel camera carrying means adapted to be suspended in front of a cameraman in a resilient yieldable manner and to provide facile movement and control of the camera about pan, tilt, and roll axes.

A further object of the present invention is to provide such a novel apparatus wherein the camera carrying means is suspended from a support member by a tensioned cable means and by a counterbalanced support arm.

A still further object of the present invention is to provide a novel apparatus for supporting a camera means in a stabilized position in front of a cameraman wherein the support means for camera carrying means may be located over the right or the left shoulder of the cameraman and wherein the apparatus may be adjusted so that the camera means may be taking a picture of a scene behind the cameraman while the cameraman moves in front of said scene.

The apparatus of the present invention includes many advantages, some of which are briefly mentioned herebelow and which will be readily understood by those skilled in the art; some of such advantages being: movement of the camera about its title axis through approximately 180°, that is 90° above or below from its normal forward horizontal viewing position; movement of the camera about its roll axis through a range of approximately 90°, that is ±45° from its normal horizontal position; movement of the camera about its main panning axis through approximately ±45° and through a limited angle about a secondary panning axis; movement of the camera vertically relative to the cameraman through about 22″ by means of a cable tension system and vertical relative movement about a secondary axis of limited range; virtual elimination of body movements transmittable to the camera means when walking or running by means of a clevis assembly; dampening inertial unbalance by the cameraman applying slight forces at horizontally spaced handles which are located at a distance from the clevis means at which the main roll, tilt and pan axes are located; convenient adjustment means for counterbalancing the main weight of the camera carrying means and for adjusting the tension in the suspending cable to facilitate ease of movement of the camera carrying means; and various other advantages and features of the present invention as hereinafter described.

It will be understood that additional objects and advantages of the invention will become readily apparent from the following description of the drawings in which an embodiment of the invention is shown.

Figures 1, 2, 3:
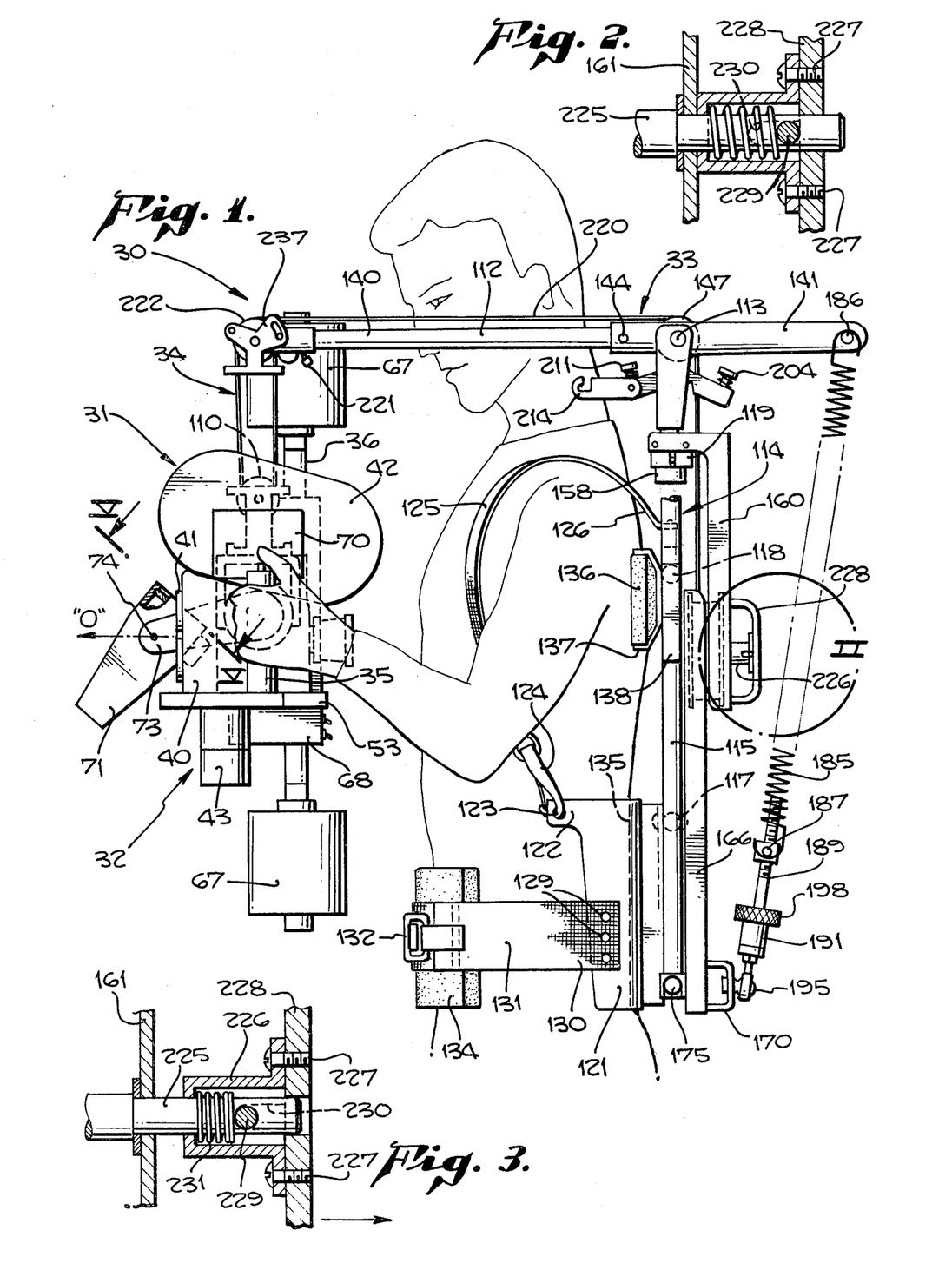
FIG. 1 is a side elevation of an apparatus embodying this invention as worn by a cameraman.
FIG. 2 is a fragmentary enlarged sectional view of tension reel adjustment means at the area indicated by circular phantom line II.
FIG. 3 is a fragmentary enlarged circular view taken in the same plane as FIG. 2 and showing a release position of the tension reel adjustment means.
Figures 4, 5:
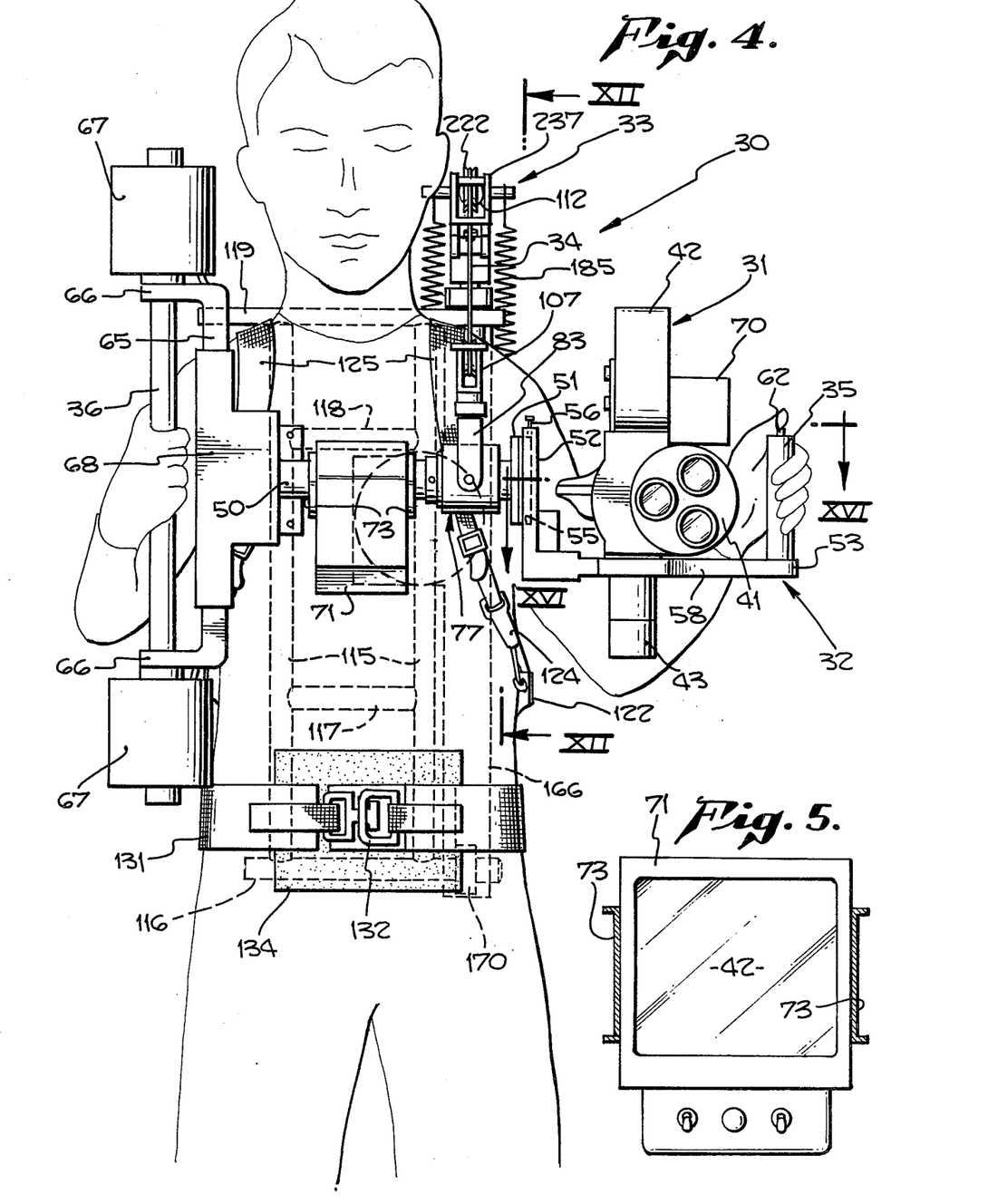
FIG. 4 is a front view of the apparatus shown in FIG. 1.
FIG. 5 is a fragmentary enlarged view of a television monitor viewfinder taken in the plane indicated by line V—V of FIG. 1.
Figure 6:
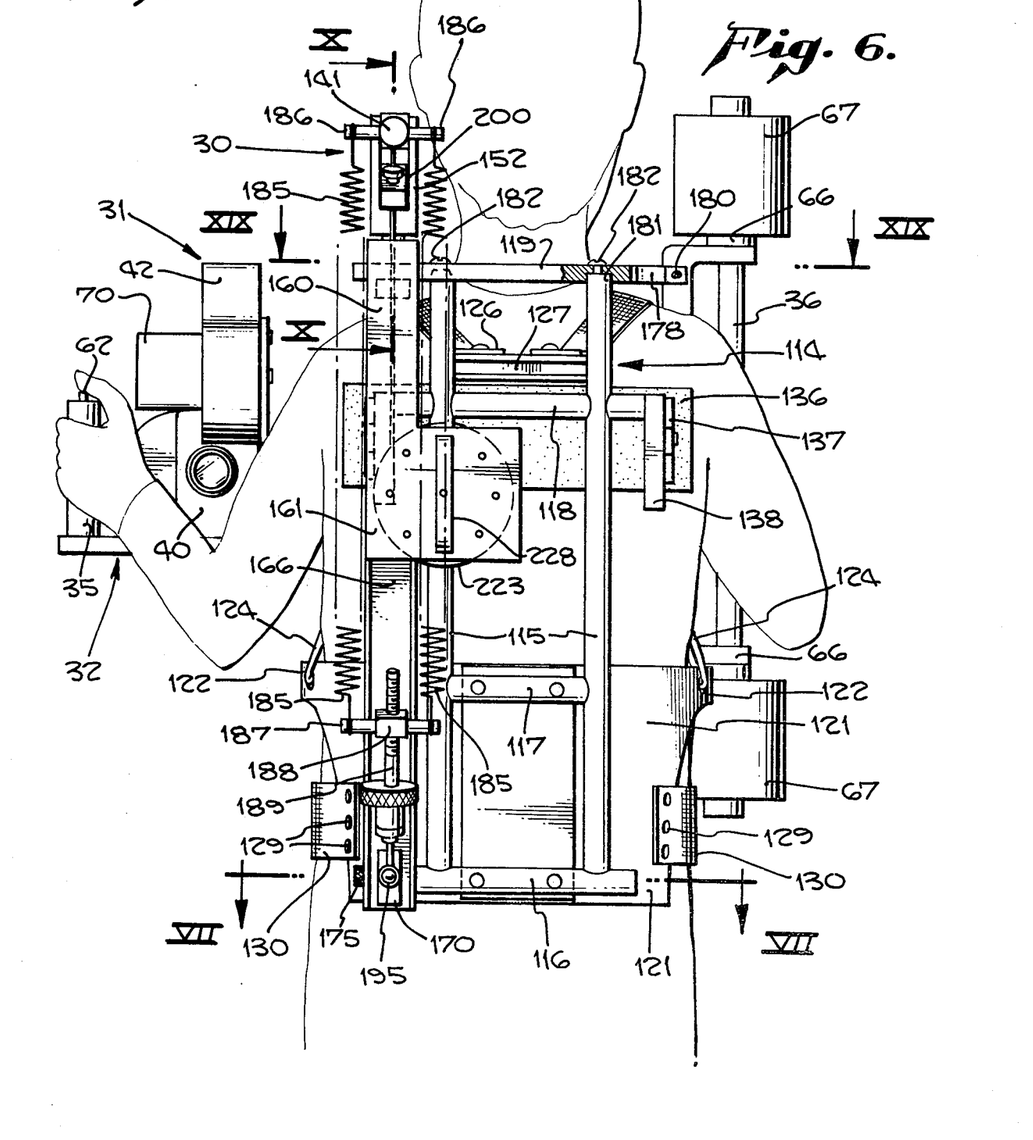
FIG. 6 is a back view of the apparatus shown in FIG. 1, and partly in section.
Figure 7:
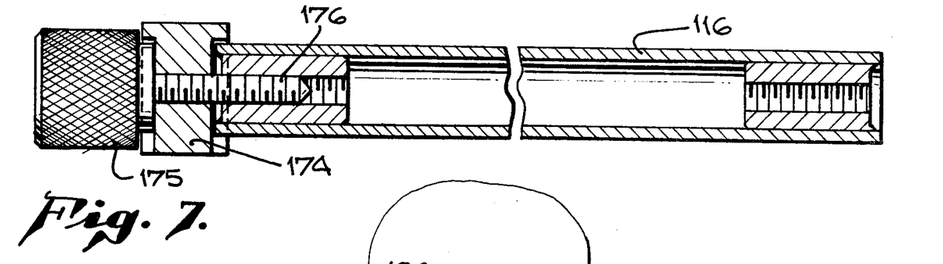
FIG. 7 is a transverse horizontal sectional view taken in the plane indicated by line VII—VII of FIG. 6.

Referring first to FIGS. 1, 4 and 6, an apparatus embodying this invention is generally indicated at 30, the apparatus 30 being adapted to be worn by a cameraman to facilitate manuevering a unitary camera means indicated at 31 while stabilizing the position of the camera means, that is substantially isolating the camera means from motion to the cameraman while he is walking, turning, running or moving up and down steps. As later described in more detail, such freedom of movement of the unitary camera means 31 requires stabilization of the position of the camera means in spaced forward relation from the cameraman. In general, apparatus 30 comprises camera carrying means 32, a means 33 for supporting the camera carrying means and means 34 for connecting and suspending the camera carrying means from the support means 33. The support means 33 and the connecting means 34 are arranged to counterbalance the weight of the entire assembly of camera carrying means and unitary camera means so that the hands of the cameraman placed on handles 35 and 36 at opposite ends of the camera carrying means 32 may readily guide and direct the camera means 31 under virtually no load, except for the guiding force imparted to the system by the cameraman.

Unitary camera means 31 may comprise any well-known make and manufacture of motion picture cameras. The unitary camera means 31 includes all of the camera components, such as the camera body 40, lens mounting means such as a turret lens 41, a magazine 42 for the film reels, and camera motor drive means 43 providing camera battery type power means for driving the camera and film reels in the magazine 42. Camera means 31 is generally illustrated and may include desired camera accessories. It should be noted that the unitary camera means 31 may be readily associated with the camera carrying means without disassembly of camera components, as later described.

Figure 16:
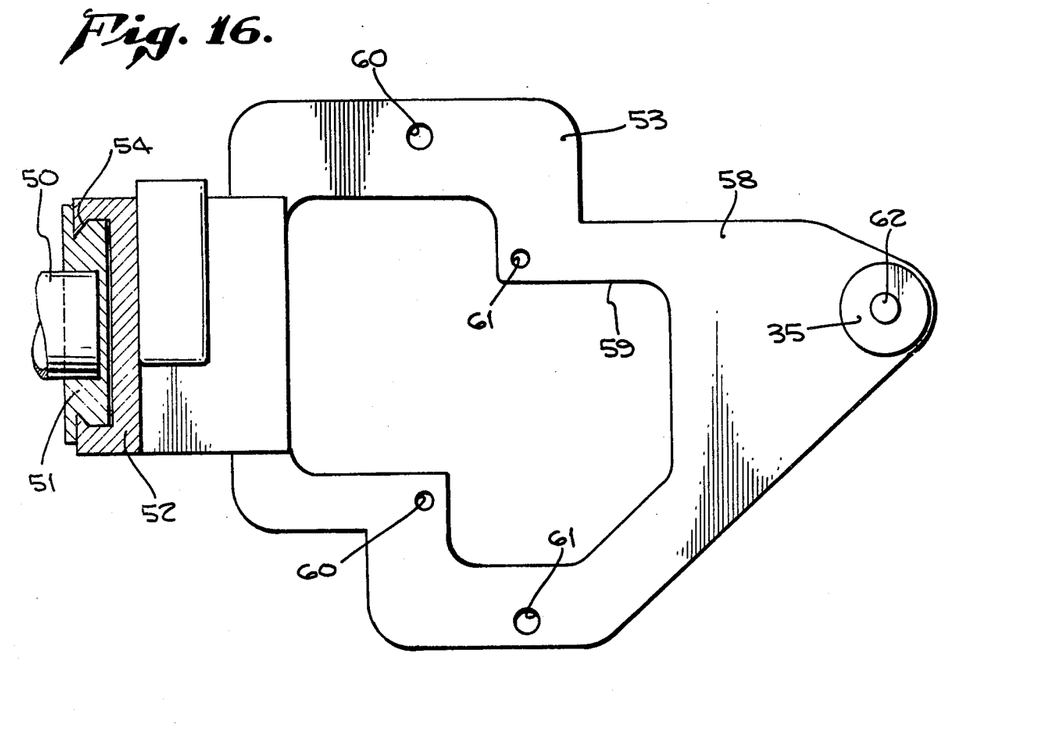
FIG. 16 is an enlarged fragmentary view taken in the horizontal plane indicated by line XVI—XVI of FIG. 4 with the unitary camera means removed.

Camera carrying means, generally indicated at 32, comprises a horizontal tubular member 50 having secured thereto at one end a vertically disposed guide member 51, FIG. 16, for reception of a cooperable guide portion 52 forming part of a camera means support bracket 53. Guides 51, 52 include slidable tongue and groove means 54 firmly positioning bracket 53 on horizontal support member 50. Guide member 52 is provided with a shoulder 55 for limiting relative movement of the guide members 51, 52. A stop screw 56 may be provided on the top portion of guide member 52 for securing the guide members 51, 52 in assembled relation.

Camera bracket 53 may include a horizontal plate 58 suitably configured for mounting a camera means thereon and including an opening 59 through which portions of the camera means, such as the drive means 43 may extend. Camera means 31 may be secured to the bracket with its taking lens directed forwardly by securement screws or bolts entering holes 60 in plate 58. When the camera is mounted for taking pictures in the opposite direction, securement holes 61 may be used. It will be understood that the particular arrangement of holes 60 and 61 may be modified for particular types of cameras.

At the distal end or outermost portion of plate 58 is mounted handle 35 which in this example may comprise a hollow tubular member adapted to carry suitable switch means actuated by a top upwardly extending press button 62. Button 62 may be conveniently operated by the thumb of the left hand of the cameraman, as illustrated in FIGS. 1 and 4.

At the opposite end of horizontal support member 50, a sidewardly and outwardly directed vertically disposed yoke member 65 may be suitably secured, the sidewardly extending arms 66 of the yoke member providing support for handle 36 which extends therebetween. Handle 36 may extend above and below arms 66 to provide suitable mounting means for battery packs 67 for supplying power to television camera and viewfinder means. Yoke member 65 adjacent its attachment to horizontal support member 50 may include a suitable housing 68 for TV circuits and components for operating TV camera 70 which is optically associated with the camera means 31 in well-known manner so as to serve as a viewfinder for camera means 31.

A TV viewfinder monitor 71 having a viewing screen 72, is suitable adjustably mounted from horizontal support member 50 by a pair of arms 73 to which the TV finder 71 is pivotally mounted at 74. The opposite ends of arms 73 may be pivotally mounted to horizontal support member 50 under selected frictional engagement therewith so that arms 73 may be adjustably turned relative to horizontal member 50 to facilitate the cameraman's eye contact with the TV monitor screen 72 in various positions of the camera carrying means.

As noted in FIG. 1, the viewing screen 72 of the finder 71 may normally be viewed at a downward angle by the eyes of the cameraman so that while the cameraman watches the scene being filmed by the taking lens of the camera means, his peripheral vision will enable him to see where he is walking or placing his feet during movement while taking a motion picture scene.

Figures 12, 13, 14, 15:
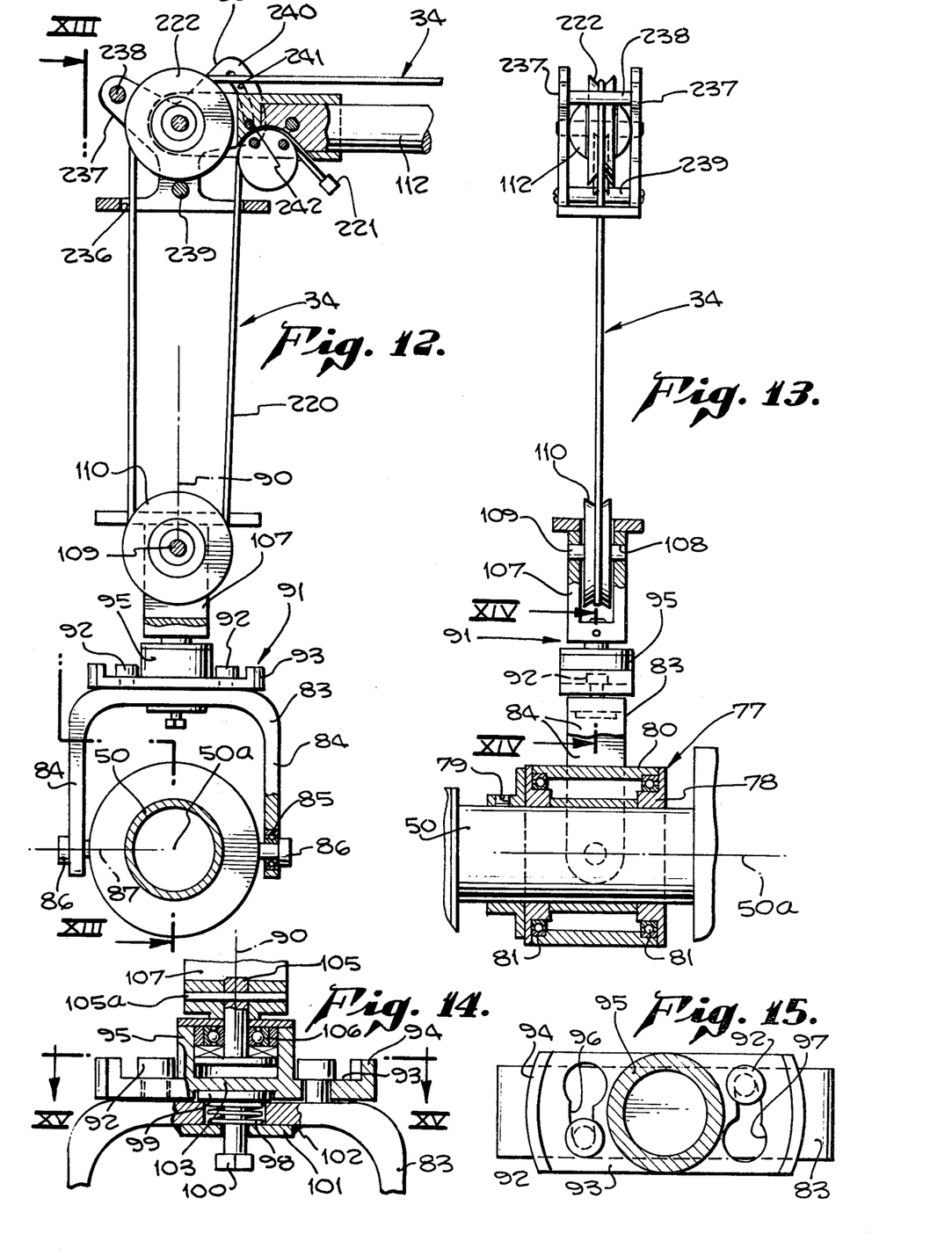
FIG. 12 is an enlarged fragmentary view partly in section taken in the vertical plane indicated by line XII—XII of FIG. 4.
FIG. 13 is a front elevational view partly in section taken in the plane indicated by line XIII—XIII if FIG. 12.
FIG. 14 is an enlarged fragmentary sectional view taken in the plane indicated by line XIV—XIV of FIG. 13.
FIG. 15 is an enlarged fragmentary view taken in the plane indicated by line XV—XV of FIG. 14 and showing a quick release means.

Means for mounting the camera carrying means to permit movement of the camera means about a tilting axis 50a comprises a cylindrical bearing housing 77, FIG. 13, which includes a housing portion 78 fitted over horizontal support member 50 between the camera bracket and the TV viewfinder monitor and secured in fixed relation to the horizontal member 50 by a set screw 79. Bearing housing 77 includes a cylindrical housing portion 80 mounted on suitable antifriction bearing means 81 carried by housing portion 78 so that support member 50 may readily rotate about its axis relative to housing portion 80.

Housing portion 80 is normally held against rotation about the axis of member 50 by connection to a downturned clevis member 83 having each of its legs 84 including antifriction bearing means 85 seated on headed trunnion means 86 carried in diametric opposite relation on cylindrical housing portion 80. Trunnion members 86 provide a forward and rearwardly directed axis parallel to the optical axis of the camera means when mounted on the camera bracket and provides a roll axis 87 about which the carrying camera means may be pivoted and to thereby move the optical axis of the camera means upwardly and downwardly about the roll axis 87.

Means for providing motion of the camera carrying means 32 about a vertical panning axis 90 may be provided in a quick release means generally indicated at 91 for releasably connecting the camera carrying means to connecting means 34. In this example, quick release means 91 includes a pair of upstanding headed studs 92 provided on clevis 83. A generally rectangular plate 93 having upstanding arcuate flanges 94 at each end for strength and an upstanding cylindrical hub 95 coaxial with pan axis 90 may include between hub 95 and arcuate flanges 93, arcuate keyhole slots 96 for interengagement with the headed studs 92. Plate 93 may be positioned relative to studs 92 to permit the enlarged heads of studs 92 to enter the enlarged circular openings 97 of the keyhole slots and upon clearance through said openings 97, plate 93 may be rotated to position the studs 92 at the narrow portion of the keyhold slot with the enlarged heads bearing against the plate 93. Such engagement is held in assembly under spring forces exerted against plate 93 by a coil spring 98 bearing against an end washer 99 carried by a headed bolt 100 which extends through a plate 101 welded to the underside of clevis 83 as at 102. It will be apparent from FIG. 14 that spring 98 exerts an upwardly directed force against hub wall portion 103 of the plate 93 to cause headed studs 92 to tightly frictionally engage plate 93 to resist disassembly.

Sufficient clearance is provided between disc 99 and the top surface of clevis 83 so that by imparting a downward force to bolt 100 the clevis 83 may be turned about the panning axis sufficiently to move the headed studs 92 into alignment with the circular openings 97 for release thereof.

Panning axis 90 is provided by shaft 105 which extends into the hollow hub 95 of plate 93 and which is provided an antifriction mounting therein by suitable bearing means 106 carried within hub 95. Shaft 105 may extend into the lower portion of an upper clevis 107 and secured therein by a transverse pin 105a. Upper clevis 107 is provided with axially aligned holes 108 for reception of the pivot axle 109 of a pulley means 110 forming part of the connecting and suspension means 34.

It will thus be apparent that the camera carrying means may be readily turned about panning axis 90 by rotation in bearing means 106. Pulley 110 and its connection to the connecting and supporting suspension means 34 serves to stabilize and maintain the panning axis 90 of the apparatus in virtually vertical position under all, except very extreme conditions of operation. In addition, since the horizontal member is pivoted about a roll axis 87 at the lower end of clevis 83 and the roll axis intersects the axis of horizontal member 50 which provides a tilt axis through bearing means 81, it will be readily apparent that such arrangement of roll and tilt axis made in spaced relation to the structure providing the pan axis further stabilizes the verticality of the panning axis.

In the arrangement of the camera carrying means, it is desirable that the television power packs 67, together with the television equipment 68 and viewfinder 71 located on one side of the roll axis 87, be substantially balanced by the weight of the bracket 53 and the camera means 31 and TV camera 70 thereon. While a precise balance is desirable, an approximate balance is not objectionable because of the fact that the cameraman's hands on the spaced handles 35 and 36 at opposite ends of the horizontal member may exert slight forces in order to maintain the camera means in desired relationship with respect to the roll axis.

The ability of the cameraman to compensate for slight imbalances in the apparatus with respect to the roll axis is also true with respect to the tilt axis. It is desirable that the TV equipment and the camera means be located relative to the tilt axis to provide substantial balance; and in this respect, it may be noted that the camera magazine 42 is generally centered above the tilt axis. Thus, some unbalance caused by a full film reel on one side of the magazine is present at the beginning of a reel and such imbalance is gradually transferred to the other reel, which is located at the other side of the tilt axis. Such minor imbalance forces are readily compensated by the cameraman with his hands on the handles 35, 36.

Camera carrying means 32 is suspended by connecting means 34 from support means 33 which may include an elongated support member 112 pivoted about a horizontal fulcrum axis 113 provided at the top of a back pack frame assembly 114. Frame assembly 114 may include a pair of parallel spaced vertical tubular members 115 having a transverse bottom member 116, intermediate transverse members 117 and 118, and a top transverse member 119. Preferably, the back frame assembly 114 is made of lightweight metal. Associated with transverse members 116 and 117 and extending therebetween and sidewardly outwardly therefrom is a curved sheet of metal 121 which generally corresponds to the curvature of the torso of a body just above the hip region. Forwardly extending upper portions 122 of sheet 121 are each provided with a hole 123 for connection to a clip hook 124 carried at the end of a shoulder strap 125 adapted to pass over the shoulder of the cameraman and secured at its other end 126 to a crossbar 127 extending between and secured to vertical members 115 above transverse member 118.

Forwardly located lower side portions of the waist metal sheet 121 may have secured thereto by suitable rivet means 129 one end 130 of a web 131 which extends forwardly and is provided with buckle means 132 for drawing the web and waist sheet 121 snugly about the waist portion of the cameraman.

Means for cushioning pressure points of the support means includes a rectangular pad of foam material 134 located opposite the buckle means 132, a pad of foam material 135 carried on the inner surface of sheet 121 for engagement with the lower back region of the cameraman and an upper back pad 136 supported by suitable brackets 137 attached to transverse member 118 through downturned end portions 138. Brackets 137 may be adjustably connected to portions 138 to adjust the height of pad 136 to facilitate adjustment of the back frame to a cameraman.

Figure 10:
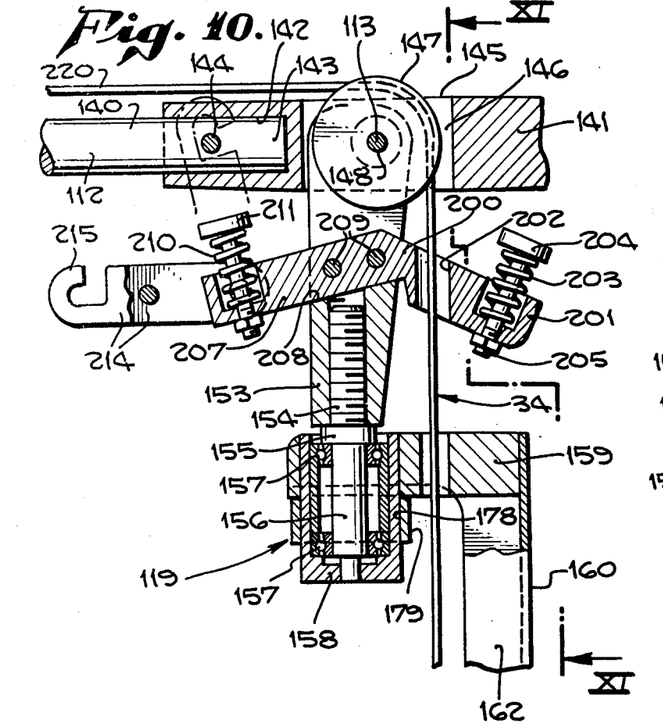
FIG. 10 is an enlarged fragmentary sectional view taken in the plane indicated by line X—X of FIG. 6.
Figure 11:
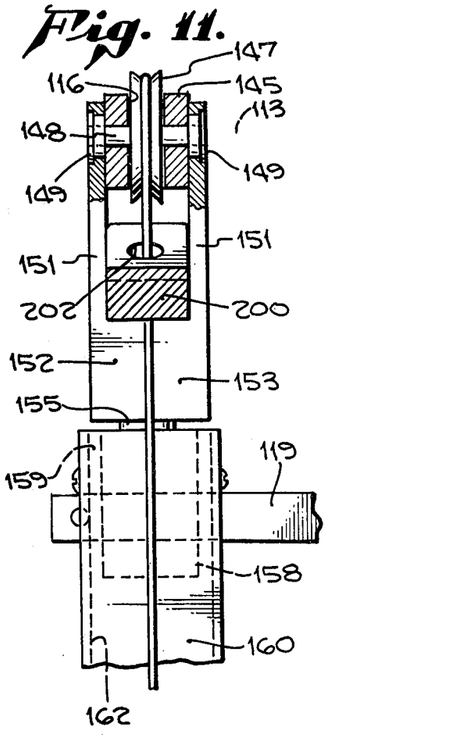
FIG. 11 is a sectional view taken in the plane indicated by line XI—XI of FIG. 10.

Means for carrying and supporting elongated support member 112 at either side of back frame 114 is best shown in FIGS. 6, 10, 11 and 1. In FIG. 10, support member 112 includes a forwardly extending rod 140 which may be suitably joined with a rearwardly extending member 141 of larger diameter and providing a socket 142 within which end 143 of member 140 is received and secured by a through pin 144. Member 141 has an intermediate portion 145 of generally rectangular section to provide a through slot 146 which may receive a cable pulley wheel 147 and an axle 148 providing pivot axis 113. Ends of axle 148 are received within bearing means 149 carried by a pair of spaced upstanding yoke arms 151 of yoke 152 having a base 153. Base 153 is threaded on a stud bolt 154 provided with an intermediate collar 155, the lower portion 156 of bolt 154 being mounted in bearings 157 to permit pivotal movement of support member 112 about the vertical axis of bolt 154. The bearing means 157 are carried within a bearing housing 158 secured in suitable manner to a support block 159. Block 159 is fixed to the upper end of a channel section column 160.

Figure 8:
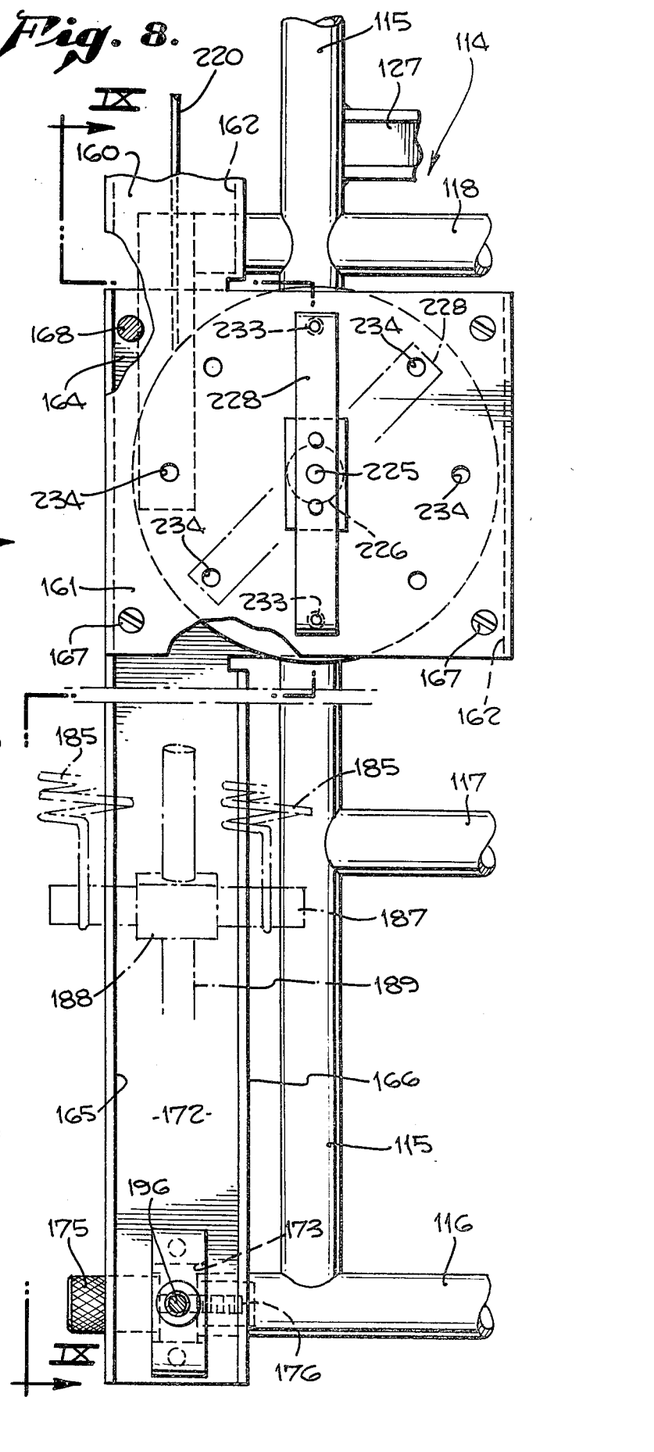
FIG. 8 is an enlarged fragmentary elevational view of the back of the apparatus at and adjacent to the tension adjustment means.
Figure 9:
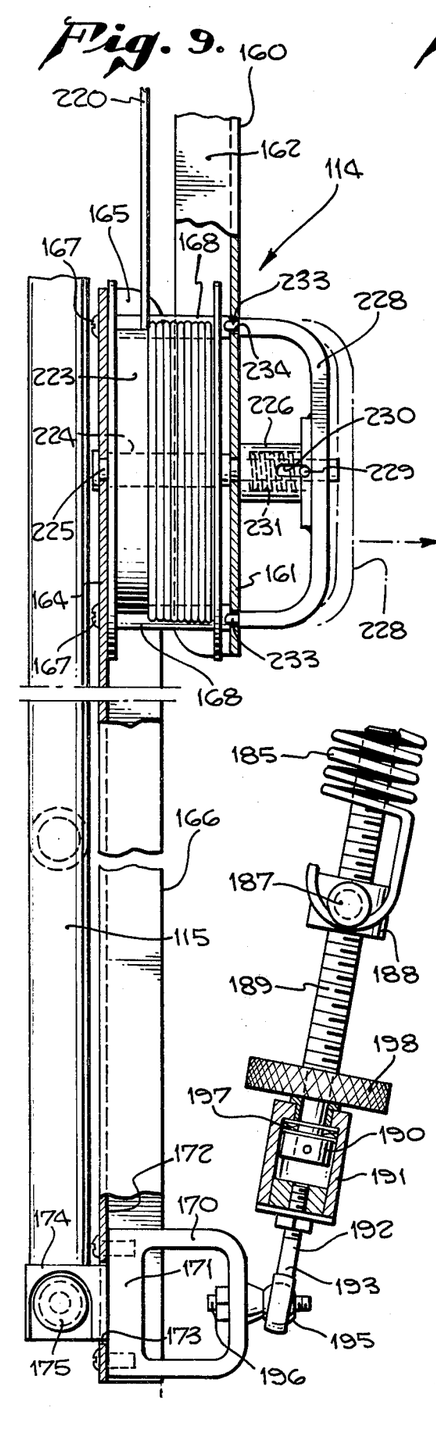
FIG. 9 is a vertical sectional view taken in the planes indicated by line IX—IX of FIG. 8.

As best shown in FIGS. 6, 8 and 9, the lower end of channel section column 160 is provided with a polygonal laterally extending plate 161 having vertical edge flanges 162. Directly opposite plate 161 and having the same polygonal configuration is plate 164 having vertical edge flanges 165, plate 164 being integral with a lower channel section support column 166. The plates 161 and 164 are secured together in spaced relation by corner screw bolts 167 and spacer sleeves 168. The lower end of channel section column 166 is provided with a D-shaped bracket 170 having a base 171 seated against the web 172 of column 166. Web 172 is provided with an opening 173 through which extends a lug 174 which may be secured to the end of the bottom transverse member 116 by a knurled headed bolt 175 threaded as at 176 in a plug provided in the end of member 116.

The transfer of the loading of the camera carrying means supported by arm 112 about fulcrum axis 113 is transmitted to the pack frame 114 through the columns 160 and 166 as above described and also to transverse pack frame member 119 which is provided with openings 178 including split end portions 179 which may be drawn tightly together by a screw bolt 180 to snugly grasp bearing housing 158 below block 159 which may abut the upper edges of split end portions 179, FIG. 10. It will thus be apparent that the weight of the equipment is transferred to the pack frame at one side thereof and through the pack frame to the cameraman's body by the structure of the pack frame as previously described. The upper end of vertical support members 115 of the pack frame 114 are suitably received in recesses 181 provided in the bottom surface of transverse member 119 and secured therein by screws 182.

The support member 112 and the support columns 160 and 166 may be readily disassembled from the pack frame 114 by releasing the screw bolts 180 at the transverse member 119 and by releasing the knurled bolt 175 at the transverse member 116 so that the entire assembly may be mounted at the other side of the pack frame 114 for a purpose hereinafter described.

Means for counterbalancing the camera carrying means 32 which is suspended from the forward end of support member 112 may comprise a pair of counterbalance tension springs 185, FIGS. 1, 6 and 9. The upper ends of counterbalance springs 185 are connected in suitable manner to outer ends of element 186 carried at the rearmost extremity of rearwardly directed support member 141. The lower ends of springs 185 may be similarly connected to outer ends of a transverse element 187 carried by a block 188 threaded on an adjustment rod 189. Adjustment rod 189 has a lower end having a circular head 190 received within a housing 191 which is secured to a threaded shank 192 of an eye bolt 193. Bolt 193 has an eye with a semi-spherical inner surface adapted to engage for universal movement a part-spherical member 195 secured by a nut and bolt assembly 196 to the D bracket 170. Head 190 and adjustment rod 189 are mounted in bearings 197 carried within housing 191 to permit rod 189 to be readily turned by a knurled wheel 198. Turning of wheel 198 and rod 189 will cause the block 188 to advance or retract along the threaded bolt 189 and to thus modify the tension of springs 185 so that a main counterbalancing force is exerted by the springs 185 about the pivotal axis 113 of the support member 112.

Means for limiting pivotal movement about axis 113 may be provided by an arc limiting member 200 of angle shape and carried by base 152 of the yoke 153, FIG. 10. Angle member 200 includes a rear downwardly inclined leg 201 provided with a through hole 202 for passage therethrough of tension cable means 34. At the end of angle leg 201, a recess is provided for seating of a spring 203 which upwardly biases a headed bumper element 204 secured by a nut 205. Headed element 204 serves as a bumper for engagement with the bottom surface of rearwardly extending support member 141 when the support member 112 is pivoted about axis 113 in such a manner that the camera carrying means is raised to a maximum.

Angle member 200 also includes a forwardly directed angle leg 207 which rests upon an inclined surface 208 on the base 152 of yoke 153 and is secured by rivets 209 to yoke 153. The forward end of leg 207 is similarly provided with a biasing spring 210 for holding headed bolt 211 in extended position for contact with the undersurface of that part of arm 141 lying forwardly of pivot axis 113 to limit forward downward movement of the arm.

Pivotally attached to the extremity of forwardly extending leg 207 are a pair of latch members 214, each having a hook 215 adapted to engage outer extremities of pin 144 to retain support member 112 in approximately horizontal position when the apparatus is not in use and is being transported to another location.

Counterbalance springs 185 provide a main counterbalancing force acting about pivot axis 113 for the weight of the camera carrying means 32. Means for more finely adjusting the counterbalancing forces and for permitting vertical travel of the camera carrying means may be provided by the tension cable means 34. A wire cable 220 has one end 221 fixedly secured at the forward end of support member 112, FIG. 1 and FIG. 12. Cable 220 passes downwardly around pulley 110 carried by the clevis means and then upwardly over a front pulley 222 and then extends along support member 112 for passage over pulley 147 and then downwardly to a cable reel or drum 223 rotatably mounted on a shouldered bolt 225 extending through plates 164 and 161. Bolt 225 extends outwardly of plate 161 and into a rearwardly directed cup-shaped housing 226 secured by suitable screws 227 to a D handle 228 used to adjust tension of the spiral spring, not shown, within the cable reel or housing 223. The outer end of bolt 225 carries a transverse pin 229 reciprocally movable in longitudinally extending slots 230 in housing 226. A spring 231 normally biases the D handle 228 into engaged position as shown in FIG. 2 and FIG. 9. In FIG. 9 it will be noted that D handle 228 is provided with short end pins 233 engageable with a pair of a plurality of pairs of openings 234 provided in plate 161. The tension on cable 220 may be adjusted by pulling outwardly on D handle 228 to disengage the pins 233 from the openings 234 and then turning handle 228 to the right or to the left, depending upon tightening or loosening of the tension in cable 220. When a set of holes 234 have been selected and the D handle is moved to the desired position for tensioning the spring within the housing 223, the handle will be returned by biasing spring 231 against plate 161 and the pins 233 will be held in biased locked relation in the selected openings 234. It will be apparent that such adjustment of the tension in cable 220 by the tension reel arrangement will provide not only fine adjustment of the counterbalancing forces acting on the camera carrying means 32, but will also permit the camera carrying means to be stabilized and counterbalanced in a selected position at any point during the vertical travel of the camera carrying means as permitted by the cable 220.

It will be noted that at the forward end of support member 112 the cable 220 is guided through an opening 236 provided in pivotally mounted members 237 provided at each side of the pulley 222. Members 237 are interconnected by spacer rods 238 and 239. Each of members 237 include a sector shaped portion 240 which is rearwardly directed and is provided with an arcuate slot 241 for reception of a pin 242. Pin 242 projects outwardly from opposite sides of the front end mounting of support member 112 and limits relative pivotal movement of the members 237 about pivot axis of the pulley 222 relative to support member 112.

In use of the camera stabilizing body mount of this invention, the pack frame 114 may be assembled with the support means 33 by securing the bearing housing 158 in the transverse frame member 119 as previously described and at the side of the back frame desired by the cameraman. The lower end of the channel column member 166 is secured to the lower transverse frame member 116 by the knurled bolt 175, as previously described. The assembled support means 33 and pack frame 114 may then be mounted on a cameraman by pulling shoulder straps 125 over the shoulders and clipping the lower ends thereof to the configured metal waist member 121. The waist belt 131 may be snugly drawn about the waist of the cameraman's body and secured by buckle means 132.

The camera carrying means 32 may then be assembled with the suspension means 34 by raising the assembled camera carrying means for insertion of the headed bolts 92 in the slots 96 of the quick release means carried at the lower end of the suspension means 34. When the load of the camera carrying means is taken by the suspension means and the support means 33, the adjustment wheel 198 may be turned to select a spring tension in springs 185 which will counterbalance the weight of the camera carrying means so that the support member 112 is approximately horizontal.

The suspension means 34 provides displacement of the camera carrying means vertically through about 22 inches and to assure stability or maintenance of its position at a selected height in such range the tension reel held between channel section columns 160 and 166 may be adjusted by the D handle 228 so that the spring tension in the tension reel will impose a counterbalancing force in the cable so that the camera carrying means may be moved to a selected vertical height and will remain positioned therein until the cameraman imposes an upward or downward force thereto by his hands.

When the body mount of this invention is completely assembled and worn by the cameraman, it will be noted that the support member 112 is spaced slightly above the shoulder of the cameraman and passes to one side of the head of the cameraman with sufficient clearance to permit turning of the head of the cameraman, if necessary. The support arm member 112 extends forwardly of the cameraman's head a sufficient distance so that the camera carrying means is spaced approximately 12 inches in front of the cameraman's body. At this position, the arms of the cameraman may readily grasp the horizontally spaced handles 35 and 36 without stretching or cramping. At such forwardly spaced position of the camera carrying means, the television viewfinder monitor 71 is readily viewable by the cameraman at a downward angle of approximately 45°. At such an angle, the vertical peripheral vision of the cameraman encompasses not only the ground upon which he may be walking, but also includes vision of an area forwardly of the cameraman. The viewfinder 71 is readily adjusted to any desired angle by the cameraman, and its friction mounting will permit maintenance of such adjusted position until the cameraman desires to modify the position of the viewfinder.

From a consideration of FIGS. 12 and 13, it will be apparent that the roll axis 87, the tilt axis 50a, and the pan axis 90 will intersect at a point within the horizontal member 50. With respect to the tilt axis, horizontal member 50 lies transverse to the direction in which the cameraman faces and equipment mounted thereon, that is the unitary camera 31 and TV camera 70, are substantially balanced by the TV power packs 67 and TV components 68 so that rolling of the camera carrying means about the horizontal forwardly directed roll axis 87 is minimized and readily controlled by the spaced handles 35, 36.

The equipment carried by horizontal member 50 is essentially arranged in a transverse vertical zone which passes through the tilt axis defined by the horizontal member 50. The several pieces of equipment are substantially balanced with respect to the tilt axis. The magazine 42 of the camera is generally centered over this axis so that unbalance caused by movement of the film from one side of the axis to the other is minimized. As best seen in FIG. 1, the optical axis O of the camera taking lens lies slightly below the tilt axis and in general alignment with the handles 35, 36 to facilitate positioning or orientation of the taking lens in direct relation to the position of the hands of the cameraman.

Figure 17:
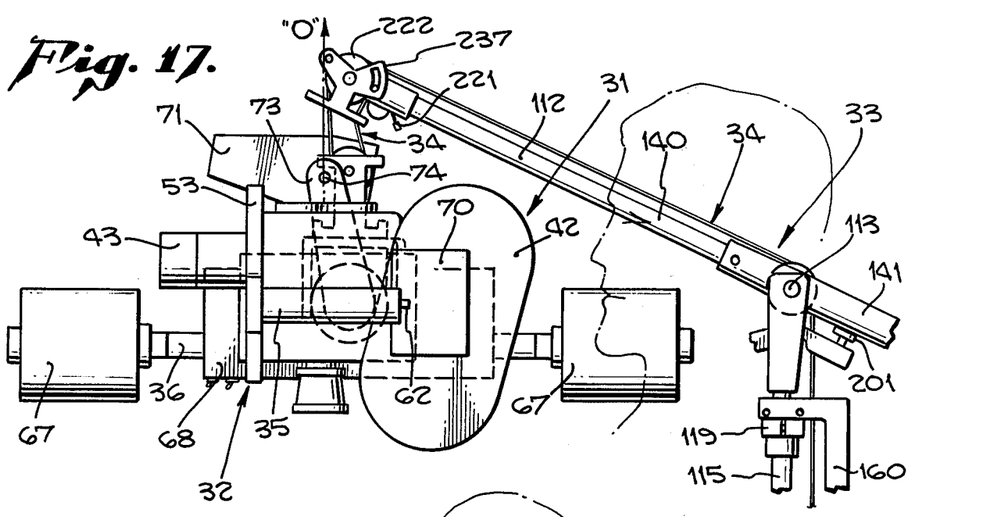
FIG. 17 is a fragmentary elevational view of one position of the apparatus of this invention with the camera taking lens directed vertically upwardly.
Figure 18:
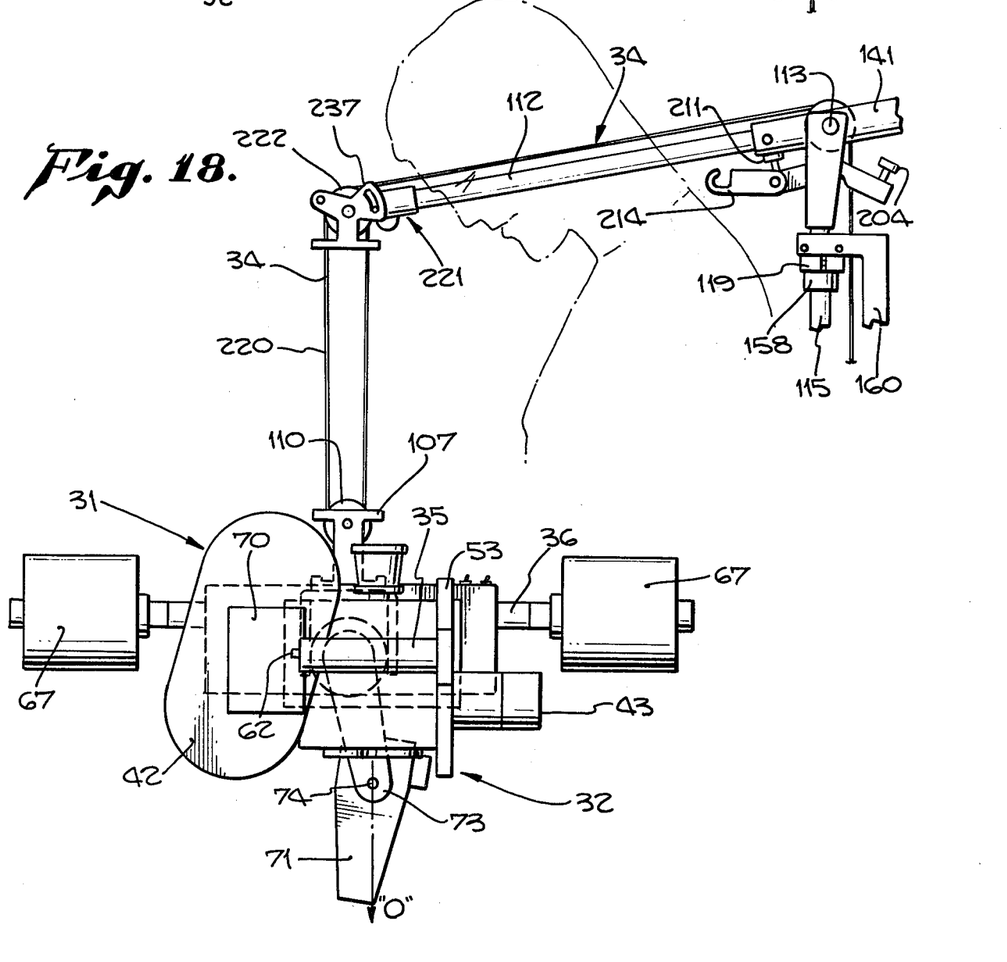
FIG. 18 is an elevational view of the apparatus of this invention with the camera taking lens directed downwardly.
Figure 19:
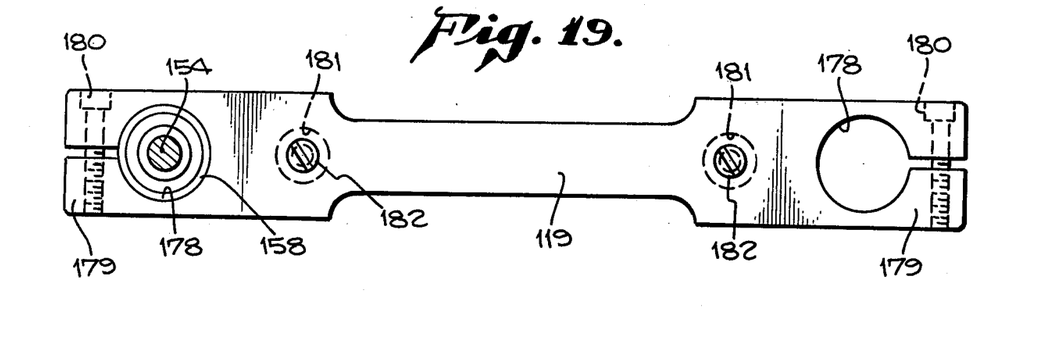
FIG. 19 is a plan view of a top mounting member taken from the plane indicated by line XIX—XIX of FIG. 6.

In FIGS. 17 and 18 are illustrated positions of the camera carrying means with the optical axis directed vertically upwardly, FIG. 17, and with the optical axis O directed vertically downwardly, FIG. 18. In FIG. 17, it will be noted that the handles 35, 36 of the camera carrying means are readily adapted to facilitate positioning of the optical axis in a vertically upward direction, particularly by lifting upwardly on the camera carrying means so as to provide limited rotation of the support member 112 about its horizontal pivotal axis 113. Sufficient room for maneuvering the arms of the cameraman is thus readily provided. In such positioning of the camera carrying means, the viewfinder monitor 71 may be slightly tilted about its axis 74 to afford convenient viewing of the viewfinder screen. In FIG. 17 it will be noted that the cable means 34 has permitted raising of the camera carrying means to almost its uppermost position.

In FIG. 18, where the optical axis of the camera is directed vertically downwardly, it will be noted that the support member 112 has been pivoted about its axis 113 into a downwardly inclined position and that the cable means 34 has been extended to permit the operator's arms to conveniently reach handles 35 and 36 so as to precisely control the position of the camera carrying means. The viewfinder monitor 71 may again be slightly changed in position in order to afford convenient viewing of the TV screen by the cameraman.

In the several positions which the cameraman can control and guide the camera carrying means, it will be understood that the roll, tilt, pan axes of the camera carrying means provide primary directional control of the position of the camera. Cooperable with such primary control are the limited vertical and lateral movement of the support member 112 about its respective horizontal axis 113 and vertical axis provided by bearing means 157. It will be apparent to those skilled in the art that when the cameraman desires to direct the optical axis of the camera toward an area beyond the limits of the primary and secondary control axes that turning of the cameraman's body will be directly transmitted to the camera carrying means through the pack frame and support member 112 and to the extent compensated therefore by the hands of the cameraman controlling the position of the optical axis with respect to the roll, tilt and pan axes provided by the camera carrying means.

The distribution of weight of the camera carrying means to the cameraman's body is located primarily in the hip region of the cameraman, thus permitting the arms of the cameraman to be quite free to manipulate the position of the optical axis by the spaced apart handle means 35, 36. Thus, the cameraman is capable of limited bending and turning of the upper portion of his body about the hip region for precisely controlling the camera means.

Figure 20:
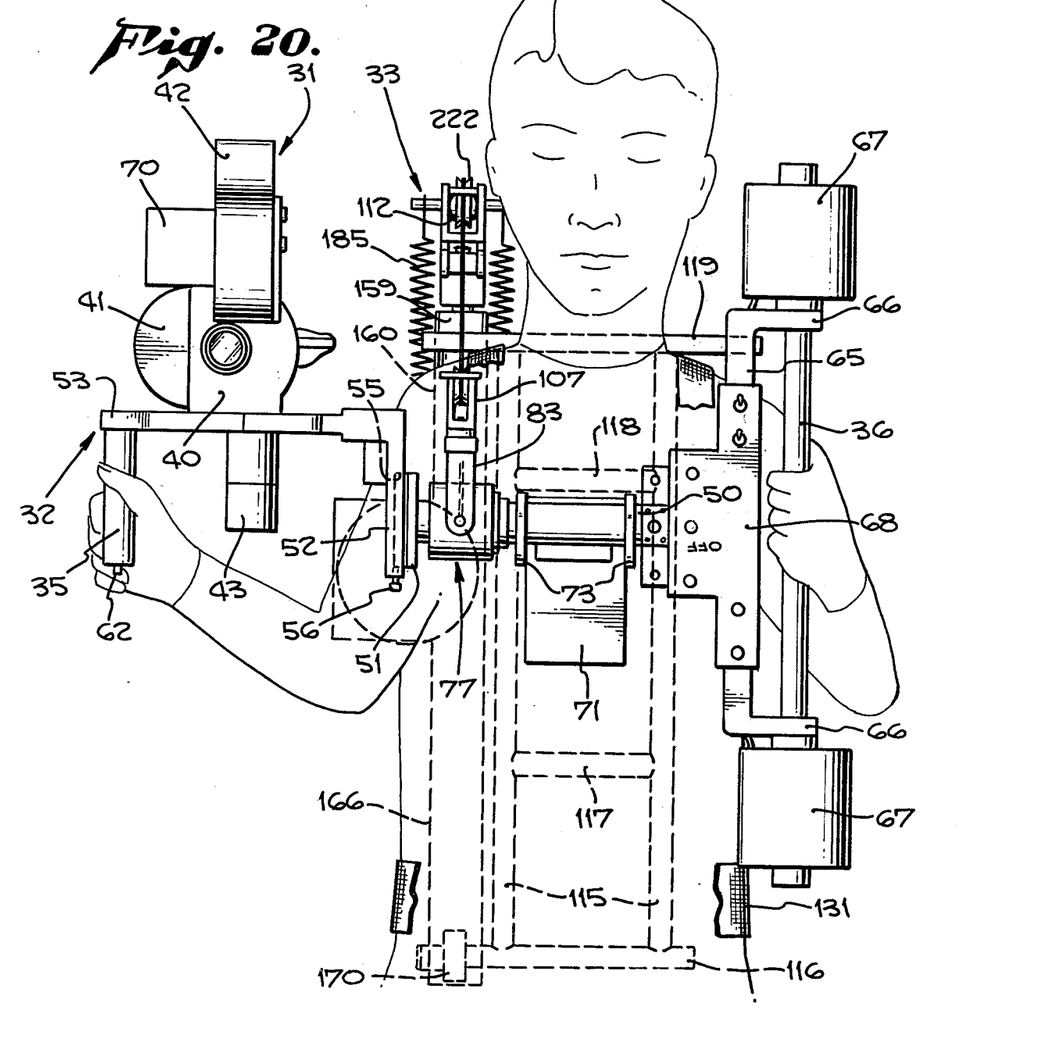
FIG. 20 is a front view of a cameraman with the apparatus of this invention assembled with the camera taking lens directed rearwardly of the cameraman.

In some situations, it may be desirable for a cameraman to walk in front of a subject being filmed. Walking backward to accomplish this is hazardous. As shown in FIG. 20, the camera stabilizing body mount of this invention is readily adapted for mounting the camera in such manner that the cameraman may walk forwardly and face in a forward direction while at the same time recording the subject or scene which lies behind him. In the example shown in FIG. 20, the support member 112 and the supporting columns 160 and 166 are transferred to the other or right side of the pack frame and secured therein in the same manner as their securement on the left side of the pack frame as previously described. The camera carrying means may be pivoted about the pan axis so that the long handle 36 is at the left of the cameraman and the unitary camera means 31 at the right of the cameraman. To position the optical axis of the camera so that it is not obstructed by the right arm of the cameraman, the camera bracket 53 is reversed or turned over and resecured in the guideways provided by mounting bracket 51 and 52. The camera means 31 may be relocated and secured to the holes 61 provided in the plate 58 of the camera bracket as shown in FIG. 16. The TV viewfinder 71 may be suitably adjusted so that the cameraman may view the scene at a convenient angle.

From a consideration of FIG. 20, it will be apparent that the camera means 31 can be manipulated about the roll, pan and tilt axis in the same manner as previously described and that the scene behind the cameraman can be readily filmed while the cameraman keeps his distance in front of the scene being filmed.

In the description of the exemplary embodiment of this invention, the camera carrying means has been associated with a cameraman's body which serves as a live mobile means for movement of the camera means. As noted in the prior art mobile means may also include use of various types of vehicles in place of a cameraman's body. Therefore, it will be understood that the camera carrying means, support means therefor, and the connecting and suspension means may be employed on mobile means such as vehicles and such is contemplated by this invention. For example, the camera carrying means may be connected at its clevis means to a resilient yieldable suspension means provided on a vehicle (automobile, boat, airplane, etc.) and supported in front of a cameraman. The cameraman may control and use the camera means substantially as described above although the camera carrying means is not supported from a back frame worn by a cameraman.

It is thus important to note that the camera carrying means provides a novel arrangement and assembly of camera means and viewfinder means which, when suspended in front of a cameraman, is stabilized and enhances the ease with which motion pictures may be taken under mobile and/or stationary conditions.

Further, the support means for the camera carrying means and the suspension means may be modified and changed while still providing vertical movement of the camera carrying means and movement of the support means and suspension means about secondary pan and tilt axes.

It will be understood that various changes and modifications may be made within the apparatus described above which come within the spirit of this invention, and all such changes and modifications coming within the scope of the appended claims are embraced thereby.

We claim:

1. In combination with an apparatus for stabilizing a camera means in which the camera carrying means is adapted to be positioned in spaced relation to a cameraman's body, the provision of:
   means supporting said camera carrying means including
   an elongated support member adapted to be positioned above the shoulder of a cameraman;
   back frame means having a pivotal connection to said support member intermediate ends of the support member;
   counterbalance means interconnected between said support member and said back frame means;
   and suspension means carried by said support member for suspending said camera carrying means below one end of said support member;
   said suspension means including
   a set of pulleys on said support member;
   a tension reel on said back frame means;
   and a cable wound on said tension reel and extending over said pulleys for connection to said camera carrying means.

2. In an apparatus as stated in claim 1 including
   means for adjusting said tension reel for counterbalancing said camera carrying means.

3. In the combination as stated in claim 1 wherein
   said back frame means includes means for mounting said support member over either one of the shoulders of a cameraman.

4. In combination with an apparatus for stabilizing a camera means in which the camera carrying means is adapted to be positioned in spaced relation to a cameraman's body, the provision of:
   means supporting said camera carrying means including
   an elongated support member adapted to be positioned above the shoulder of a cameraman;
   back frame means having a pivotal connection to said support member intermediate ends of the support member;
   counterbalance means interconnected between said support member and said back frame means;
   and suspension means carried by said support member for suspending said camera carrying means below one end of said support member;
   said suspension means including
   pulley means on said support member;
   a pulley on said camera carrying means;
   a cable guided by said pulley means and by said pulley on said camera carrying means;
   and means adjustably connecting one end of the cable to the back frame means.

5. In the combination as stated in claim 4 wherein said means adjustably connecting one end of the cable to the back frame means includes
   a tension reel carried by the back frame means.

6. In combination with an apparatus for stabilizing a camera means in which the camera carrying means is adapted to be positioned in spaced relation to a cameraman's body, the provision of
   means supporting said camera carrying means including
   an elongated support member adapted to be positioned above the shoulder of a cameraman;
   back frame means having a pivotal connection to said support member intermediate ends of the support member;
   counterbalance means interconnected between said support member and said back frame means;
   and suspension means carried by said support member for suspending said camera carrying means below one end of said support member;
   said pivotal connection of the support member to the back frame means being arranged to provide movement of the support movement about horizontal and vertical axes;
   and means associated with the back frame means for limiting movement of the support member about said horizontal and vertical axes.

7. In a combination as stated in claim 6 wherein said means for limiting movement of the support member about said vertical axis includes
   a pair of counterbalancing spring means having ends connected in lateral spaced relation to one end of the support member and on opposite sides thereof to resiliently restrain such movement about the vertical axis.

8. In the combination as stated in claim 6 wherein said means for limiting movement of the support member about a horizontal axis includes bumper means connected with the back frame means for engagement by the support member to restrict pivotal movement of the support member about the horizontal axis.

9. In the combination as stated in claim 8 including
a latch member pivotally connected to said bumper means and adapted for latching engagement with means on said support member for locking said support member in one position.

10. In combination with a suspension support means for supporting a unitary camera means generally in front of one shoulder of a cameraman and offset sidewardly from the cameraman's normally straight forward viewing position, the provision of:
a vertically yieldable and movable support element depending from and carried by the forward end of said support means;
a horizontally disposed member having a horizontal axis positioned below the yieldable support element; said horizontal member having means at one end thereof for supporting a unitary camera means;
the other end of said horizontal member having counterbalance means including TV components;
means connecting the depending yieldable support element to a portion of the horizontal member between said unitary camera means and said counterbalance means,
said connecting means including means for tilting movement about the horizontal axis of the horizontal member and camera means connected thereto,
means for rolling movement of the horizontal member about an axis parallel to the optical axis of the camera means.
and means for panning movement of the horizontal member and camera means about a vertical axis spaced from the optical axis of the camera means and located above said horizontal member;
said panning means being connected to said yieldable support element;
a television viewfinder mounted on the horizontal member between the connecting means and the counterbalance means and in front of and normally below the cameraman's head;
and handle means adjacent ends of the horizontal member.

11. In the combination as stated in claim 10 wherein said yieldable, movable support element includes
a cable adapted to be carried by said suspension means.

12. In the combination as stated in claim 10 wherein said suspension support means includes
a support arm;
a frame means pivotally supporting said support arm;
said yieldable movable support element being pivotally connected to the forward end of said support arm.

13. In the combination as stated in claim 12 wherein said support element includes a cable;
pulley means on said support arm for guiding said cable;
and tension reel means on said frame means for tensioning said cable.

14. In the combination as stated in claim 10 including release means between the panning means and the roll means for separating the horizontal member from said yieldable support element.

15. In the combination as stated in claim 14 wherein said release means includes a plate having bearing means for panning about a vertical axis,
cooperable key and keyhole means on said plate and on said roll means,
and spring means biasing said key and keyhole means to retain assembly of said horizontal member and said yieldable support element.

16. In an apparatus for stabilizing and controlling movement of a camera means in which camera carrying means is adapted to be positioned in spaced relation to a cameraman's body and suspended from a support arm extending over the shoulder of a cameraman, said support arm carrying suspension means for said camera carrying means, the connection between said suspension means and camera carrying means including means for panning, tilting and rolling a camera carried thereby, the provision of:
first counterbalance means connected to said support arm to provide main counterbalancing forces for the weight of said camera carrying means and arranged to provide limited pivotal movement of said support arm about a vertical axis;
and second counterbalancing means including a tension reel and cable connected thereto and carried by said support arm and connected to said camera carrying means for finely adjusting the counterbalancing forces acting on said camera carrying means.

* * * * *